H. P. KRAFT.
PUMP COUPLING.
APPLICATION FILED DEC. 19, 1919. RENEWED MAR. 23, 1922.

1,433,518. Patented Oct. 24, 1922.

INVENTOR:
Henry P. Kraft
By Attorneys,

Patented Oct. 24, 1922.

1,433,518

UNITED STATES PATENT OFFICE.

HENRY P. KRAFT, OF RIDGEWOOD, NEW JERSEY.

PUMP COUPLING.

Application filed December 19, 1919, Serial No. 346,017. Renewed March 23, 1922. Serial No. 546,182.

*To all whom it may concern:*

Be it known that I, HENRY P. KRAFT, a citizen of the United States of America, residing in Ridgewood, in the county of Bergen and State of New Jersey, have invented certain new and useful Improvements in Pump Couplings, of which the following is a specification.

This invention relates to pump couplings or the like, and aims to provide certain improvements therein.

The invention is particularly directed to pump couplings for pneumatic tires, such couplings usually comprising a shank adapted to be connected with an inflation tube, and a nut adapted to be screwed on the tire valve. Usually the nut is swivelled to the shank so that it may be turned independently thereof. The packing washer is usually located on the lower face of the shank, and according to former constructions difficulty was had in removing the washer for purposes of repairs. In my application No. 177,005 I have shown and described a pump coupling in which the nut portion is made separate from the swivelled portion, and is provided with a non-rotative connection therewith, such nut portion being held in place so that it can be removed without removing the swivelled portion, and the washer being easily accessible. The present invention relates to a simplification of the device of the aforesaid application, and provides a cheap and simple structure in which the nut portion can be easily removed and replaced.

Referring to the drawings, which illustrate one form of the invention,—

Figure 1:
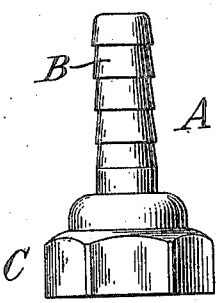
Figure 1 is an elevation of the pump coupling provided by the invention.
Figure 2:
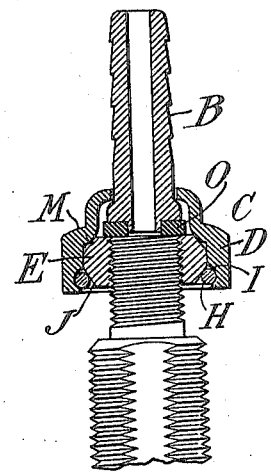
Fig. 2 is a diametrical section, showing the coupling applied to a tire valve.

Referring to the drawings, let A indicate the coupling as a whole which commonly is provided with a serrated shank B, over which is slipped the end of the inflating tube. C is the foot portion of the coupling which is sometimes formed as an integral part of the shank B, and is sometimes formed as a separate member D which is swivelled to the shank, as shown in the drawing.

Figure 4:
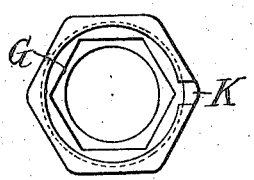
Fig. 4 is a bottom face view of Figure 1.
Figure 7:
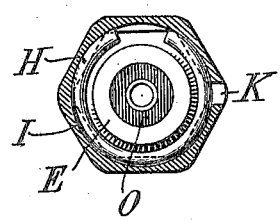
Fig. 7 is a bottom plan view of Fig. 3, the swivelled connection being shown in section.
Figure 5:
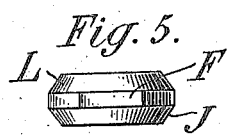
Fig. 5 is an elevation of the nut portion detached.
Figure 6:
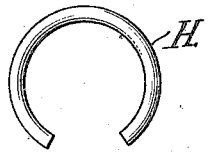
Fig. 6 is a view of the retaining ring.

According to the aforesaid application the nut portion E is made separately from the foot portion, and is provided with a non-circular connection therewith. This is retained in the present construction, the nut portion being shown as having flats F which fit within the foot portion, the latter having a hexagonal recess G, as best seen in Figure 4.

Figure 3:
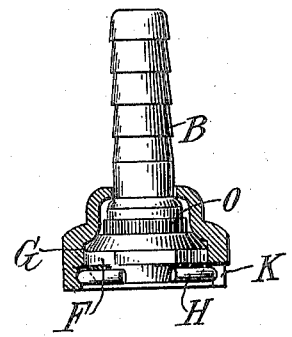
Fig. 3 is a view, showing the shank portion and nut in elevation, with the swivelled connection in diametrical section.

According to the present invention I provide a means for retaining the nut portion in the member D, comprising an elastic member adapted to be sprung into place, so as to overhang both portions. The member I prefer to employ is a split ring H, which is sprung into a groove I in the member D. The ring H is enabled to pass into the groove by the cut-away portion J of the nut. In order to facilitate the removal of the ring, I prefer to provide a slot K in one side of the member D, as shown in Figure 3. A tool may be inserted through this slot to a position under the ring, whereupon the ring may be lifted out by the tool.

I prefer to provide the nut with a tapered inner face L, which fits a corresponding taper M on the interior of the member D, and the cut-away portion J of the nut is also preferably tapered. This secures a firm seating of the nut in the member D.

By this construction the nut can easily be removed so that the packing O which is shown as being arranged at the lower end of the shank B, can be easily removed and replaced.

It will be understood that the construction herein described is useful for other purposes than pneumatic tire pump couplings, and it will also be understood that I do not wish to be limited to the precise construction shown, since various changes may be made therein without departing from the spirit of the invention.

What I claim is:

1. In a pump coupling or the like, the combination of a member having a passage through it, a nut-holding portion connected thereto, a nut having a non-rotative connection with the nut-holding portion, and a spring member for retaining the nut therein.

2. In a pump coupling or the like, the combination of a member having a passage through it, a nut-holding portion connected thereto, a nut having a non-rotative connection with the nut-holding portion, and a spring ring for retaining the nut therein.

3. In a pump coupling or the like, the combination or a shank having a passage through it, a nut-holding portion connected thereto, a nut having a non-rotative connection with the nut-holding portion, and a spring member for retaining the nut therein.

4. In a pump coupling or the like, the combination of a shank, having a passage through it, a nut-holding portion connected thereto, a nut having a non-rotative connection with said nut-holding portion, and an expansion ring for retaining the nut therein.

5. In a pump coupling or the like, the combination of a shank having a passage therethrough, a nut-holding portion swivelled to said shank, a nut having a non-rotative connection with said nut-holding portion, and a spring member for retaining the nut therein.

6. In a pump coupling or the like, the combination of a shank having a passage therethrough, a nut-holding portion swivelled to said shank, a nut having a non-rotative connection with said nut-holding portion, and a spring ring for retaining the nut therein.

7. In a pump coupling or the like, the combination of a shank member having a passage therethrough, a nut-holding portion having a bevel interior face, a nut having a bevel face fitting against the bevel face of the nut-holding portion, said nut-holding portion having a groove, and a spring ring lying in said groove.

8. In a pump coupling or the like, the combination of a member having a passage through it, a nut-holding portion connected thereto, a nut having a non-rotative connection with the nut-holding portion, and a spring member for retaining the nut therein, and said nut-holding portion having a slot for the removal of said spring member.

In witness whereof, I have hereunto signed my name.

HENRY P. KRAFT.